United States Patent
Shiratori

(10) Patent No.: US 8,249,859 B2
(45) Date of Patent: Aug. 21, 2012

(54) TECHNOLOGY FOR SELECTING TEXTS SUITABLE AS PROCESSING OBJECTS

(75) Inventor: Takaaki Shiratori, Machida (JP)

(73) Assignee: International Business Machines Corporation, Armonk, NY (US)

( * ) Notice: Subject to any disclaimer, the term of this patent is extended or adjusted under 35 U.S.C. 154(b) by 1152 days.

(21) Appl. No.: 12/061,293

(22) Filed: Apr. 2, 2008

(65) Prior Publication Data

US 2009/0024383 A1    Jan. 22, 2009

(30) Foreign Application Priority Data

Jul. 20, 2007    (JP) ................. 2007-188996

(51) Int. Cl.
*G06F 17/28*    (2006.01)
*G06F 17/27*    (2006.01)
(52) U.S. Cl. ..................... 704/4; 704/2; 704/9
(58) Field of Classification Search .............. 704/1–10
See application file for complete search history.

(56) References Cited

U.S. PATENT DOCUMENTS

| | | | | |
|---|---|---|---|---|
| 5,311,429 | A * | 5/1994 | Tominaga | 704/10 |
| 5,323,310 | A * | 6/1994 | Robinson | 704/2 |
| 5,442,546 | A * | 8/1995 | Kaji et al. | 704/4 |
| 5,867,811 | A * | 2/1999 | O'Donoghue | 704/1 |
| 7,080,320 | B2 * | 7/2006 | Ono | 715/264 |
| 2004/0186706 | A1 * | 9/2004 | Itoh et al. | 704/10 |

* cited by examiner

*Primary Examiner* — Samuel G Neway

(74) *Attorney, Agent, or Firm* — DeLizio Gilliam, PLLC

(57) ABSTRACT

There is a system for selecting a text for output from among multiple texts according to whether or not a phrase is included in the multiple texts. The system includes a determination unit that determines whether or not each of predetermined multiple phrases is included in each of the multiple texts; an index calculation unit that, with respect to each of the multiple phrases, calculates a larger index for a text having the highest of priorities preset among texts including the phrase, then indexes for other texts; and an output unit that selects texts each having a larger sum of sums of the calculated index for each text and outputs a group of the selected texts.

19 Claims, 14 Drawing Sheets

FIG. 4

| NO | ENGLISH | TRANSLATION RESULT | VERIFICATION RESULT | PAGE | URL | FREQUENCY |
|----|---------|-------------------|---------------------|------|-----|-----------|
| 4 | ############# ############ <0> ############ ############ | ############# ############ | | 0 | | 1 |
| 5 | (Title of page) http://www-306.ibm.com/software/support/ | | | 0 | http://e-support_mt.tck | 1 |
| 10 | Country/region select | 国家/地区[通过选择] | | 0 | http://e-support_mt.tck | 36 |
| 14 | Terms of use | 使用条款 | | 0 | http://e-support_mt.tck | 36 |
| 25 | Home | 家 | | 0 | http://e-support_mt.tck | 36 |
| 28 | Products | 产品 | | 0 | http://e-support_mt.tck | 36 |
| 31 | Services & solutions | 为所作的服务和的解决方案 | | 0 | http://e-support_mt.tck | 36 |
| 34 | Support & downloads | 技术支持的下载 | | 0 | http://e-support_mt.tck | 36 |
| 37 | My account | 我的记述 | | 0 | http://e-support_mt.tck | 36 |
| 41 | Software | 软件 | | 0 | http://e-support_mt.tck | 1 |
| 43 | Trials and betas | 试用的第二个 | | 0 | http://e-support_mt.tck | 36 |
| 45 | Support | 技术支持 | | 0 | http://e-support_mt.tck | 36 |
| 47 | Training and certification | 培训和证明 | | 0 | http://e-support_mt.tck | 36 |
| 49 | Services | 为所作的服务 | | 0 | http://e-support_mt.tck | 36 |
| 51 | Library | 图书馆 | | 0 | http://e-support_mt.tck | 36 |
| 53 | Events | 事件 | | 0 | http://e-support_mt.tck | 36 |
| 55 | News | 新闻 | | 0 | http://e-support_mt.tck | 36 |
| 57 | Communities | 社区 | | 0 | http://e-support_mt.tck | 36 |
| 59 | IBM Business Partners | 国际商业机器公司商务合伙 | | 0 | http://e-support_mt.tck | 37 |
| 61 | ISVs | ISVs | | 0 | http://e-support_mt.tck | 36 |
| 63 | Developers | 开发者 | | 0 | http://e-support_mt.tck | 36 |
| 65 | Warranty info | 保修情报 | | 0 | http://e-support_mt.tck | 36 |
| 67 | Software | 软件 | | 0 | http://e-support_mt.tck | 1 |
| 77 | Sign in Register | 签到登记 | | 0 | http://e-support_mt.tck | 36 |
| 79 | Software support | 软件技术支持 | | 0 | http://e-support_mt.tck | 1 |
| 97 | Overview Search Download Submit/track problems Assistance | 概览|搜索|下载|提交/跟踪的问题|帮助 | | 0 | http://e-support_mt.tck | 4 |
| 100 | Find product support | 发表产品技术支持 | | 0 | http://e-support_mt.tck | 2 |
| 102 | Select a category below: | 通过选择一个下面的种类: | | 0 | http://e-support_mt.tck | 2 |

| NO. | ENGLISH | TRANSLATION RESULT | VERIFICATION RESULT | PAGE | URL | FREQUENCY |
|---|---|---|---|---|---|---|
| 4 | ******** ******** <0> ******** ******** | ******** ******** | | 0 | http://e-support_mt.tck | 1 |
| 5 | [Title of page] http://www-306.ibm.com/software/support/ | 国际商业机器公司软件技术支持 | | 0 | http://e-support_mt.tck | 1 |
| 10 | Country/region select | 国家/地区 [通过选择] | 国家/地区 选择 | 0 | http://e-support_mt.tck | 36 |
| 14 | Terms of use | 使用条款 | | 0 | http://e-support_mt.tck | 36 |
| 25 | Home | 家 | 主页 | 0 | http://e-support_mt.tck | 36 |
| 28 | Products | 产品 | | 0 | http://e-support_mt.tck | 36 |
| 31 | Services & solutions | 为所有的服务合约的解决方案 | 服务和解决方案 | 0 | http://e-support_mt.tck | 36 |
| 34 | Support & downloads | 技术支持和下载 | | 0 | http://e-support_mt.tck | 36 |
| 37 | My account | 我的记录 | 我的帐号 | 0 | http://e-support_mt.tck | 1 |
| 41 | Software | 软件 | | 0 | http://e-support_mt.tck | 36 |
| 43 | Trials and betas | 试用和第三个 | 试用服务和Beta版 | 0 | http://e-support_mt.tck | 36 |
| 45 | Support | 技术支持 | | 0 | http://e-support_mt.tck | 36 |
| 47 | Training and certification | 培训和证明 | 培训和认证 | 0 | http://e-support_mt.tck | 36 |
| 49 | Services | 为所有的服务 | 服务 | 0 | http://e-support_mt.tck | 36 |
| 51 | Library | 图书馆 | 资料库 | 0 | http://e-support_mt.tck | 36 |
| 53 | Events | 事件 | 活动 | 0 | http://e-support_mt.tck | 36 |
| 55 | News | 新闻 | | 0 | http://e-support_mt.tck | 36 |
| 57 | Communities | 社区 | | 0 | http://e-support_mt.tck | 36 |
| 59 | IBM Business Partners | 国际商业机器公司商务合伙 | IBM业务合作伙伴 | 0 | http://e-support_mt.tck | 37 |
| 61 | ISVs | ISVs | 独立软件供应商 | 0 | http://e-support_mt.tck | 36 |
| 63 | Developers | 开发者 | | 0 | http://e-support_mt.tck | 36 |
| 65 | Warranty info | 保单信息 | 保修信息 | 0 | http://e-support_mt.tck | 36 |
| 67 | Software | 软件> | 软件 | 0 | http://e-support_mt.tck | 1 |
| 77 | Sign in Register | 签到登记 | 登录注册 | 0 | http://e-support_mt.tck | 1 |
| 79 | Software support | 软件技术支持 | | 0 | http://e-support_mt.tck | 36 |
| 97 | Overview Search Download Submit/track problems Assistance | 概题|搜索|下载|提交/跟踪的问题|援助 | 概述搜索下载提交/跟踪的问题援助 | 0 | http://e-support_mt.tck | 4 |
| 100 | Find product support | 发现产品技术支持 | 找到产品技术支持 | 0 | http://e-support_mt.tck | 2 |
| 102 | Select a category below: | 通过选择一个下面的范畴: | 选择一个下面的类别: | 0 | http://e-support_mt.tck | 2 |

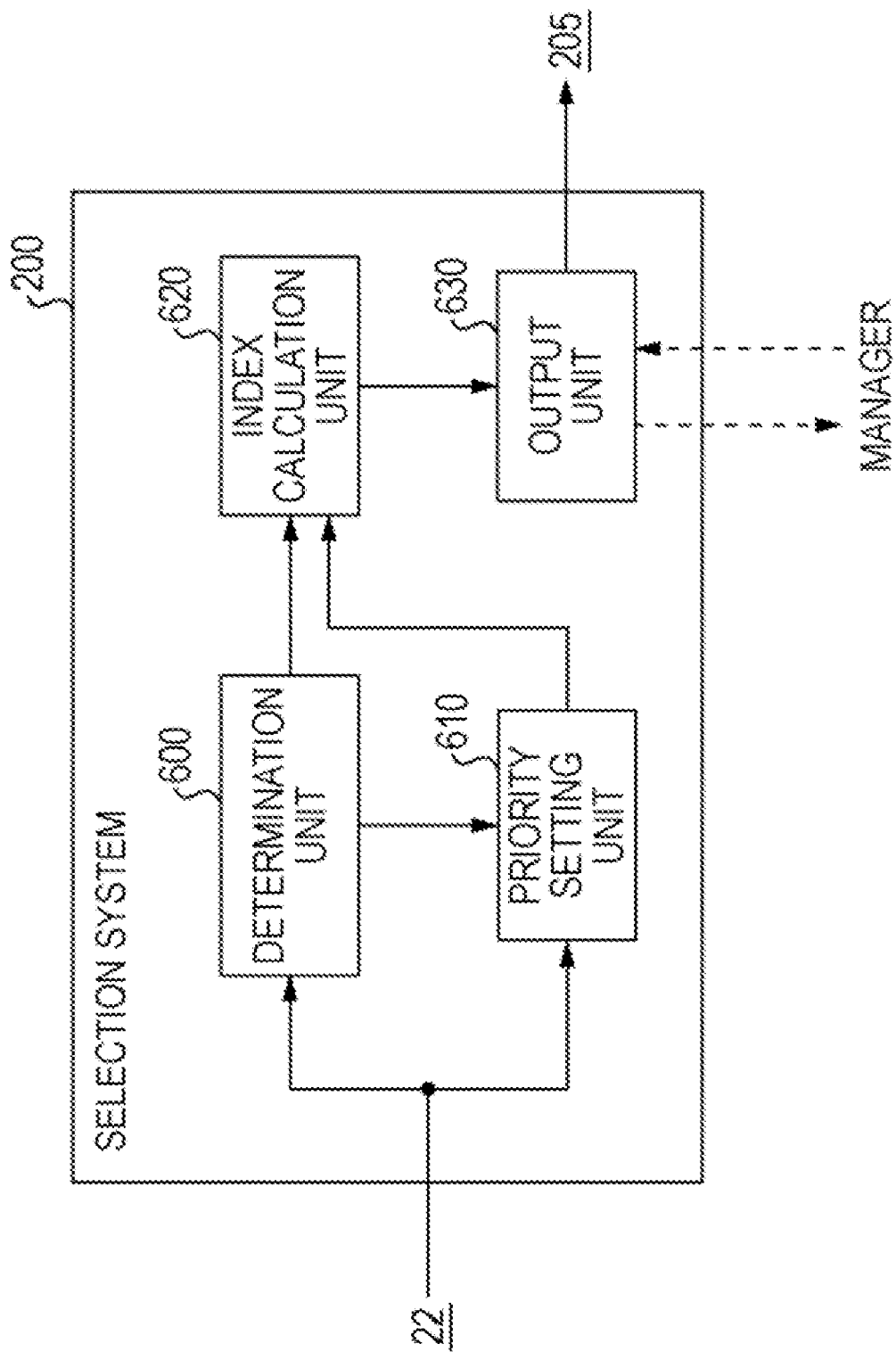

FIG. 7

| | TEXT 1 | TEXT 2 | TEXT 3 | TEXT 4 | TEXT 5 | |
|---|---|---|---|---|---|---|
| PHRASE 1 | 0 | 1 | 1 | 0 | 1 | ... |
| PHRASE 2 | 1 | 1 | 0 | 1 | 0 | ... |
| PHRASE 3 | 1 | 0 | 1 | 1 | 1 | ... |
| PHRASE 4 | 0 | 0 | 1 | 1 | 0 | ... |
| PHRASE 5 | 0 | 0 | 1 | 0 | 1 | ... |
| ... | ... | ... | ... | ... | ... | |

FIG. 8

| | TEXT 2 | | TEXT 1 | | TEXT 4 | | TEXT 3 | | TEXT 5 |
|---|---|---|---|---|---|---|---|---|---|
| PHRASE 1 | 135 | | 0 | | 0 | | 135 | | 135 |
| PHRASE 2 | 65 | | 65 | | 65 | | 0 | | 0 |
| PHRASE 3 | 0 | | 20 | | 20 | | 20 | | 20 |
| PHRASE 4 | 0 | | 0 | | 58 | | 58 | | 0 |
| PHRASE 5 | 0 | | 0 | | 0 | | 37 | | 37 |
| ... | ... | | ... | | ... | | ... | | ... |
| TOTAL | 850 | > | 650 | > | 530 | > | 345 | > | 120 |

FIG. 10

| | TEXT 2 | TEXT 1 | TEXT 4 | TEXT 3 | TEXT 5 | |
|---|---|---|---|---|---|---|
| PHRASE 1 | 135 | 0 | 0 | 0 | 0 | ⋮ |
| PHRASE 2 | 65 | 0 | 0 | 0 | 0 | ⋮ |
| PHRASE 3 | | 20 | 0 | 0 | 0 | ⋮ |
| PHRASE 4 | | | 58 | 0 | 0 | ⋮ |
| PHRASE 5 | | | | 37 | 0 | ⋮ |
| ⋯ | ⋯ | ⋯ | ⋯ | ⋯ | ⋯ | |
| TOTAL | 850 | 280 | 448 | 114 | 23 | |

TECHNOLOGY FOR SELECTING TEXTS SUITABLE AS PROCESSING OBJECTS

CROSS-REFERENCE TO RELATED APPLICATIONS

This application claims the benefit of priority, under 35 U.S. C. §119(a), of Japanese Patent Application No. 2007-188996 filed on Jul. 20, 2007, and entitled "TECHNOLOGY FOR SELECTING TEXTS SUITABLE AS PROCESSING OBJECTS" hereby incorporated by reference herein for all purposes.

BACKGROUND

The present inventive subject matter relates generally to computers. In particular, the inventive subject matter relates to processing data.

In recent years, companies that are doing business internationally offer information on their products or services to their customers in various countries in various languages. In practice, a web page can be viewed in various languages on the web sites of such companies. This is highly convenient. On the other hand, large amounts of information are provided on the web sites and are updated day to day, so the translation work of such information requires a great amount of manpower and cost. Under these circumstances, it is conceivable that if machine translation, whose accuracy has been improved in recent years, is applicable to such translation work, the translation efficiency will be improved.

SUMMARY

Embodiments include a method directed to determining if one or more phrases are in a plurality of texts submitted for translation. Priorities for the plurality of texts are set based, at least in part, on a frequency of occurrence of the one or more phrases within the texts. An index for each of the plurality of texts is calculated based at least in part on the respective priorities of the one or more texts. A subset of the plurality of texts are indicated for verifying the translation. The subset of texts comprises those of the plurality of texts with the highest indexes.

BRIEF DESCRIPTION OF THE DRAWINGS

The present embodiments may be better understood, and numerous objects, features, and advantages made apparent to those skilled in the art by referencing the accompanying drawings.

FIG. 4 depicts an example of a template.

FIG. 5 depicts an example of a verified template.

FIG. 6 depicts an example of a functional configuration of the selection system 200.

FIG. 7 displays the number of times each phrase appears in each text.

FIG. 8 depicts an example of determining the priority of input texts.

FIG. 10 displays the sums of the indexes calculated by the index calculation unit 620.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to web pages, embodiments can be implemented for other types of text based documents. In other instances, well-known instruction instances, protocols, structures and techniques have not been shown in detail in order not to obfuscate the description.

The accuracy of machine translation depends on the ability to perform processes, such as syntactic analysis, and the quality of the terms dictionary. In particular, in order to translate technical terms or so-called new words or coined words properly, it is desired that the terms dictionary includes adequate terms so as to correspond to the translation object. Therefore, in order to improve the accuracy of machine translation, words included in the texts to be translated and their appropriate translations are added in advance to the terms dictionary. However, if there is a large number of texts to be translated, such as web pages of a large-scale web site, it is not realistic to retrieve and register unregistered or mistranslated words from all the texts using manpower. If such words are retrieved from a sampling of the texts randomly selected, the translation accuracy may not be sufficiently improved.

Figure 1:
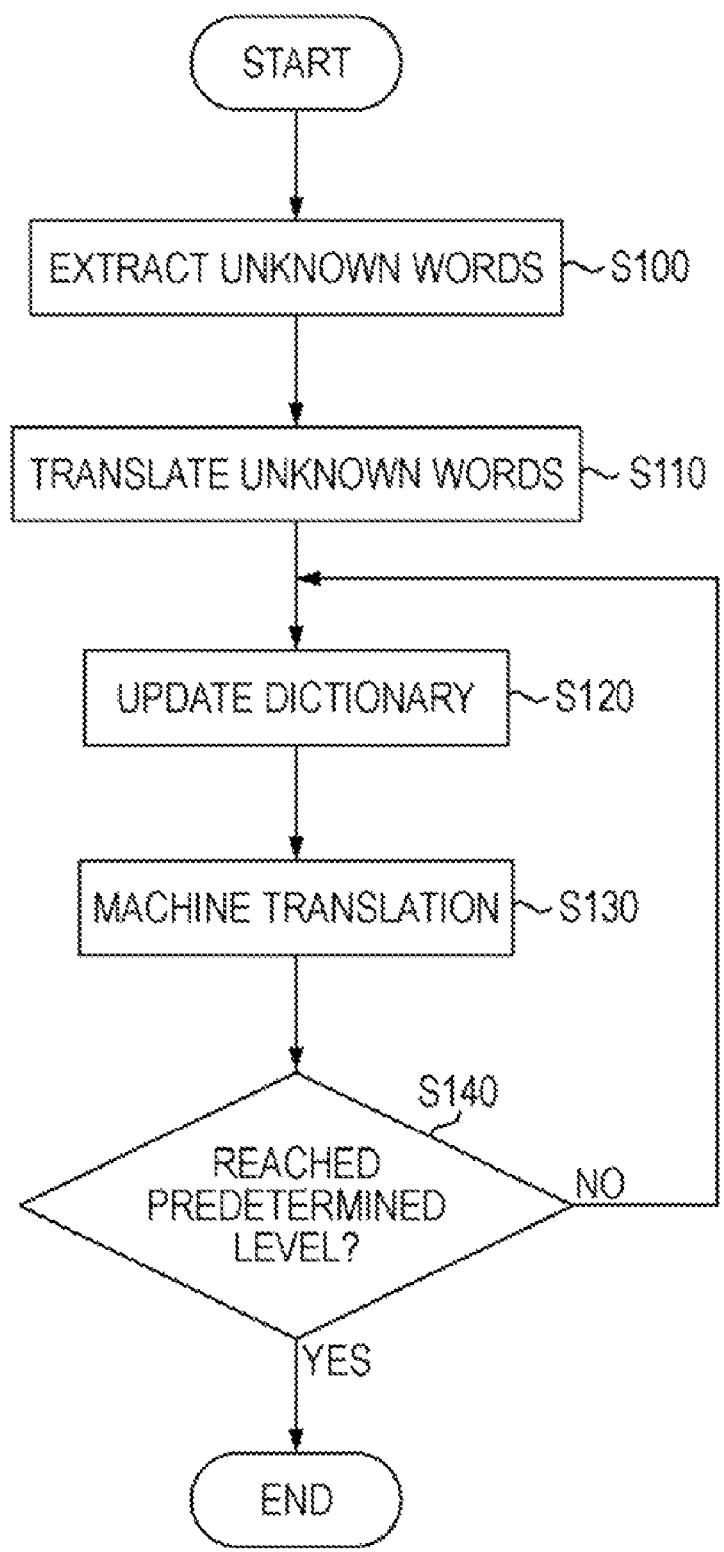
FIG. 1 is a flowchart depicting example operations for translating texts using machine translation.

FIG. 1 is a flowchart depicting example operations for translating texts using machine translation. In order to realize highly accurate translation using machine translation, first, appropriate words and their appropriate translations are registered with the dictionary for translation. For this reason, in preparation for machine translation, a user of machine translation extracts words that are yet to be registered with the dictionary and words that are to be mistranslated in the translation objects (hereafter, both will be collectively referred to as "unknown words") from the texts that are the translation objects (S100). Then the user, such as a translator, translates the extracted unknown words (S110) and registers the translation results with the dictionary in such a manner that the unknown words are associated with the translation results (S120). If there are a large amount of texts that are translation objects, registration of all the unknown words with the dictionary requires too much cost and time. Therefore, the user preferably selects only a part of the unknown words and then translates and registers the selected unknown words.

The translation machine translates the texts using the dictionary (S130). The user refers to the translated texts to determine whether or not the accuracy of the machine translation has reached a satisfactory level (S140). If the accuracy has reached the satisfactory level, the translation machine ends the processing. If not, the user returns the processing to S120, and selects additional unknown words that need be registered with the dictionary and registers these unknown words with the dictionary (second S120).

As described above, if available cost or time is limited, it is preferable to update the dictionary in stages until the translation accuracy reaches the predetermined level rather than to create a perfect dictionary in the beginning.

However, there is room for improvement in these steps. First, in S120, the user himself or herself determines which of many unknown words should be registered on a higher priority basis. Therefore, if the determination is wrong, the translation accuracy may not sufficiently be improved although the dictionary has been updated. As a result, it takes a longer time than needed until the translation accuracy reaches the satisfactory level. Originally, it is not possible to expect in advance when the translation accuracy will reach a predetermined level and, therefore, it is difficult to preset the budget and time that should be allocated to the overall translation work and to control the progress of the translation work.

Second, in S130 and S140, all the texts that are the translation objects undergo machine translation and the translation level is verified with respect to all the translation results. Each time the dictionary is updated, it takes a great amount of time to verify the translations. Even if a subset of the texts is selected and the translations of the selected texts are verified, the verification accuracy is reduced depending on how the texts are selected.

In view of the foregoing, a translation system 20 according to this embodiment is intended to improve such translation work and to support tasks, such as progress control of translation and budget control.

Figure 2:
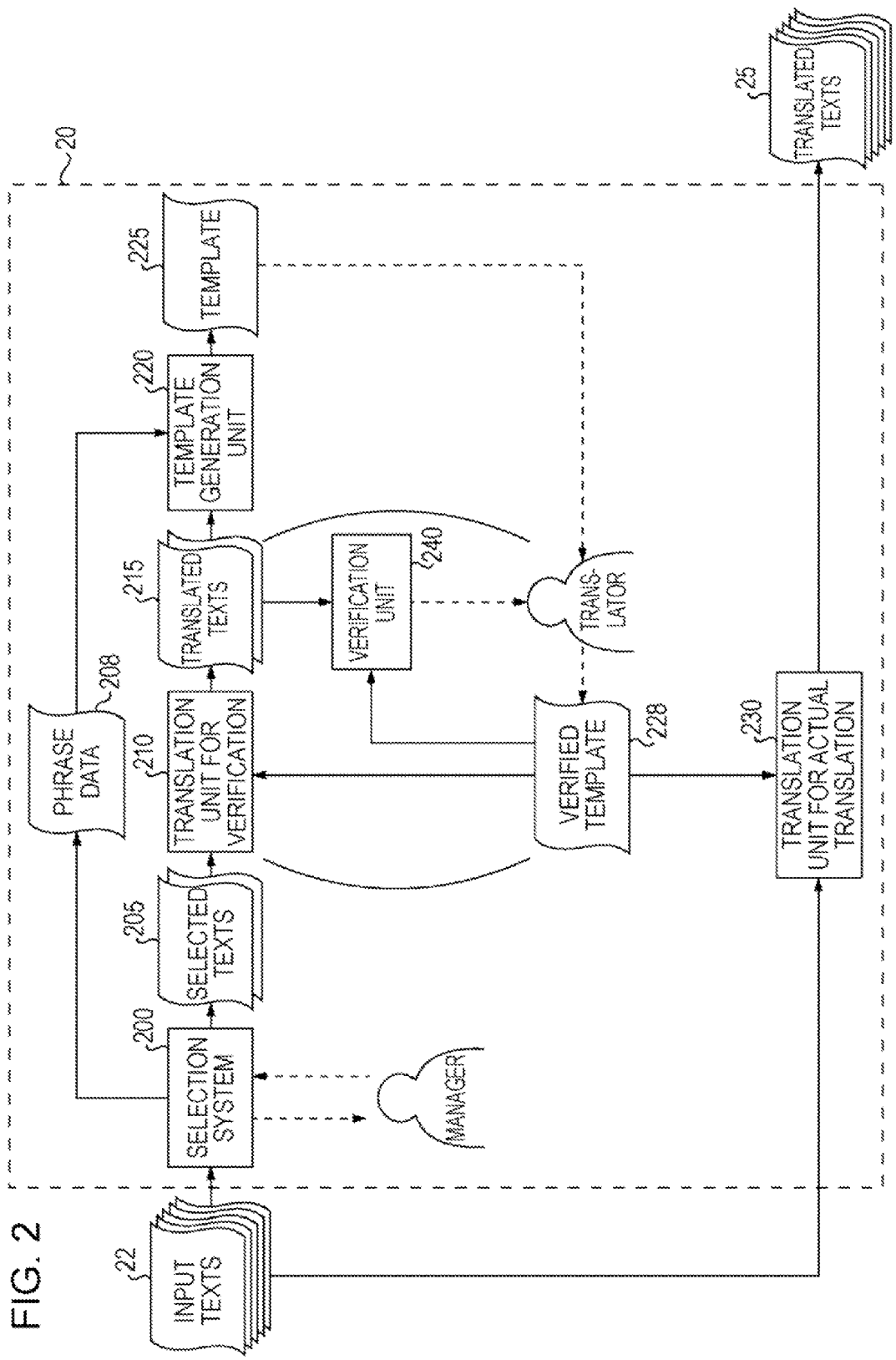
FIG. 2 depicts an example translation system 20

FIG. 2 depicts an example translation system 20. The translation system 20 serves as a selection system 200, a translation unit for verification 210, a template generation unit 220, a translation unit for actual translation 230, and a verification unit 240 according to operations of a central processing unit (CPU) 1005 and a storage device such as a RAM 1020. The selection system 200 selects texts suitable for verifying the machine translation from among multiple input texts 22. The selected texts are defined as selected texts 205. Also, the selection system 200 generates phrase data 208 in which multiple phrases included in the selected texts 205 are recorded, and outputs the phrase data 208 to the template generation unit 220. In order to select the selected texts 205, the selection system 200 may receive an input from a user, who is the manager of the translation work, and may output the selection result to the user.

The translation unit for verification 210 translates the selected texts 205 and outputs the translated texts 215 as multiple translated texts. The template generation unit 220 generates data that associates the phrases that are recorded in the phrase data 208 that have not been translated with the translated phrases that are included in the translated texts 215, and outputs the data. This data is defined as a template 225. A user, who is a translator, examines the template 225 for mistranslations. Then the user updates the template 225 by writing correct translations corresponding to the mistranslations into the template 225. The updated template 225 serves as a verified template 228. The verified template 228 is used as a dictionary for the translation unit for actual translation 230. In other words, using a dictionary to which the contents of the verified template 228 are added to the previously provided dictionary for translation, the translation unit for actual translation 230 translates the multiple input texts 22 and generates translated texts 25 that are the translation results. If words for translation included in the verified template 228 are already included in the previously provided dictionary, the translations of these words included in the verified template 228 take priority over the translations included in the previously provided dictionary and are used. Thus, the translation unit for actual translation 230 reflects the correct translations made by the translator on the translated texts 25, thereby improving the translation accuracy.

The verified template 228 may be used as a new dictionary for the translation unit for verification 210. In other words, using a dictionary based on the contents of the verified template 228, the translation unit for verification 210 retranslates the selected texts 205 and regenerates the multiple translated texts 215. Also in this case, the translations included in the verified template 228 take priority over the translations included in the dictionary previously provided in the translation unit for verification 210 and are used. Then the translator may compare the translated texts 215 with the verified template 228 to check if the correction of the mistranslations is reflected on the translated texts 215. To conduct such a check, a verification unit 240 may be used for automatically comparing the mistranslations and their correct translations in the verified template 228 with the phrases in the translated texts 215.

As described above, the translation system 20 according to this embodiment is intended to make the overall translation work more efficiently by selecting the texts suitable for verifying the translation prior to doing translation. Also, the translation system 20 according to this embodiment is able to output information indicating to what extent the translation accuracy is improved when which text's translation has been verified by the user who is the manager. Thus, the translation system 20 is also intended to assist in managing the overall translation work and measuring the progress. Hereafter, detailed explanation will be made using a case in which the selection system 200 is a system for assisting in verifying the quality of the translations of web sites.

Figure 3:
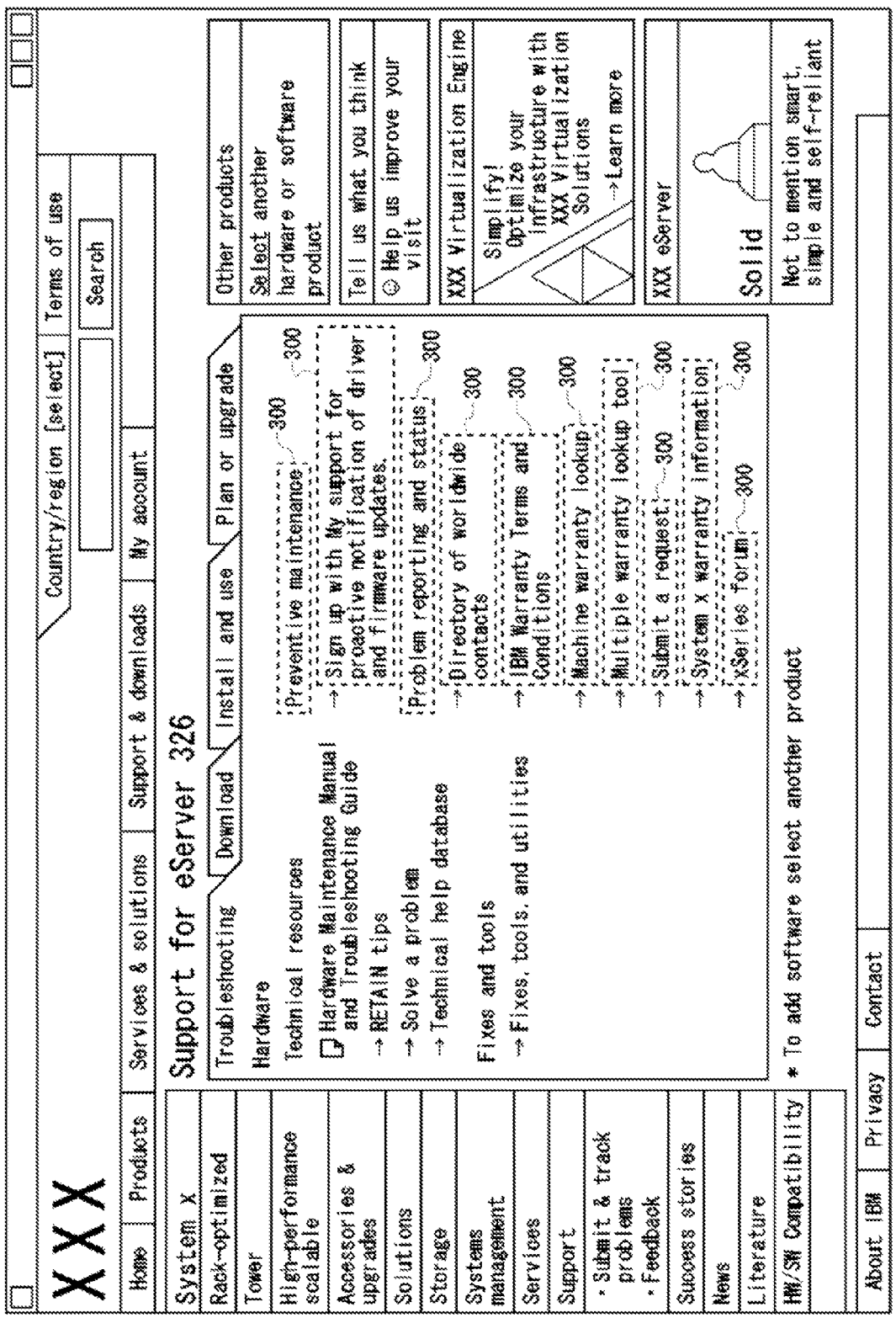
FIG. 3 depicts an example of input texts.

FIG. 3 depicts an example of input texts. For example, the multiple input texts 22 are web pages included on the same web site. For example, one of such input texts 22 includes information on products or services. For example, such input texts 22 are tagged documents, such as HTML documents, and the corresponding texts or images are displayed on the screen according to instructions indicated by tags. For example, a character string "Preventive maintenance" is included between a start tag and the corresponding end tag in the input texts 22. Therefore, this character string is displayed on the screen according to an instruction indicated by the tags, for example, in a particular color and a font.

The selection system 200 extracts such character strings between start tags and end tags included in the input texts 22 and handles these character strings as units for determining the appearance frequency of each character string and selects the selected texts 205 that should be used to verify the translations, on the basis of the appearance frequencies. Hereafter, the character strings that are units for determining the appearance frequencies will be referred to as phrases 300. For example, the character strings indicated with reference numerals 300 attached thereto are the phrases 300. The phrases 300 may be used as units for machine translation in addition to being used as units for determining the appearance frequencies.

FIG. 4 depicts an example of a template. In the template 225, with respect to each of the phrases 300 extracted by the selection system 200, the number for identifying the phrase, the original character string (for example, in English), the character string that is the translation result of the original character string (for example, in Chinese simplified characters), the pages on which the translation appear, the URLs of these pages, and the appearance frequency of the character string are recorded in such a manner that these items are associated with one another. For example, with respect to a phrase 300 numbered 37, the original character string is "My Account," the translation result is " "我的记述" " (this is described in Japanese kanji due to the limitation of the character codes available for application specifications; in practice, this is described in the corresponding Chinese simplified characters), the URL(s) of the pages in which the translation result is included are "http://www.e-support_mt.tok . . . ", and the appearance frequency is 36. The template 225 may include a data field "verification result" for inputting correct translations if translation results are determined to be mistranslations by verification.

FIG. 5 depicts an example of a verified template. The verification template 228 includes correct translations inputted by the translator into the data field "verification result." For example, with respect to the phrase 300 numbered 37, a correct translation is inputted into the data field "verification result" instead of the mistranslation "我的记述".If the translator has verified that the translation of the phrase is correct, nothing is input into the field "verification result" of the verified template 228.

FIG. 6 depicts an example of a functional configuration of the selection system 200. The selection system 200 includes a determination unit 600, a priority setting unit 610, an index calculation unit 620, and an output unit 630. The determination unit 600 determines if each of the predetermined multiple phrases 300 is included in each of the multiple input texts 22. For example, as described above, the phrases 300 may be character strings written in HTML between start tags and end tags in each text. That is, the determination unit 600 may first extract the phrases 300 from the input texts 22 and then determine whether or not each of the phrases 300 is included in each of the input texts 22.

The priority setting unit 610 sets priorities between the multiple input texts 22. For example, such priorities may previously be set by an input from the user or the like as priorities indicating the importance levels of pieces of information included in the input texts 22. Also, the priority setting unit 610 may set a higher priority for an input text 22 comprehensively including a variety of phrases 300 than those for other input texts 22. For another example, if the input texts 22 are web pages, the priority setting unit 610 may set a higher priority for an input text 22 for which the server of the web site has received a higher frequency of display request from clients, than those for other input texts 22. Also, the priority setting unit 610 may set a higher priority for an input text 22 that, includes a phrase 300 appearing more frequently across the multiple input texts 22, than those for other input texts 22.

With respect to each of the multiple phrases, the index calculation unit 620 calculates a larger index for an input text 22 with the highest priority as set by the priority setting unit 610, among input texts 22 including the phrase, than those for other input texts 22 including the phrase. For example, assume that an input text A and an input text B both include a phrase "My account." If the input text B is given a higher priority than that for the input text A, the index calculation unit 620 calculates a higher index for the input text B than that for the input text A. Indexes are calculated for each phrase. Therefore, depending on the situation of appearance of another phrase, a higher index may be calculated for the input text A than that for another input text C.

The output unit 630 selects input 22 texts having larger calculated indexes for each input text 22 and outputs a group of the selected texts as the multiple selected texts 205. For example, the output unit 630 may select a predetermined number (N number) of texts that have the largest ones of the sums of the indexes. Also, the output unit 630 may display, to the user who is the manager, the "appearance ratio" that is a numerical value indicating to what extent the group of the outputted selected texts 205 comprehensively include the phrases 300 that appear across the web site. Further, in response to an input from the manager who has viewed the appearance ratio, the output unit 630 may change the number N of the selected input texts 22 and select the changed number N of selected texts as the selected texts 205.

FIG. 7 displays the number of times each phrase appears in each text. In an example shown in FIG. 7, the determination unit 600 determines whether or not phrases 1 to 5 are included in input texts 1 to 5. In FIG. 7, the determination results are displayed in a matrix. Specifically, a numerical value 1 in a column corresponding to an input text 22 and in a row corresponding to a phrase 300 indicates that the phrase 300 is included in the input text 22 one time. If the phrase 300 is included in the input text 22 twice, a numerical value 2 is displayed.

For example, in the row of a phrase 1, a numerical value 1 is displayed in each of the columns of texts 2, 3, and 5. This indicates that the phrase 1 is included once in each of the texts 2, 3, and 5.

As described above, after determining if each of the phrases are included in each of the input texts, the determination unit 600 may calculate the number of the included phrases, if any. The calculation results are indicated, for example, using a data structure in a matrix as shown in FIG. 7.

FIG. 8 depicts an example of determining the priority of input texts. Referring to FIG. 8, a specific example of the process in which the priority setting unit 610 sets priorities between the input texts 22 will be described. First, with respect to each of the phrases 300, the priority setting unit 610 calculates the frequency at which the phrase 300 appears in the multiple input texts 22. For example, the appearance frequency of a phrase 300 is the number of times the phrase 300 is included in each of the input texts 22, calculated by the determination unit 600. For example, phrase 1 appears 135 times in texts 1 to 5. Therefore, the priority setting unit 610 calculates a numerical value 135 as the appearance frequency of the phrase 1.

Then, for each of the input texts 22, the priority setting 610 sums the frequencies calculated with respect to the phrases 300 included in the input text 22. For example, text 2 includes the phrases 1 and 2 but not the phrases 3 to 5. Therefore, with respect to text 2, the priority setting unit 610 sums the frequency 135 of the phase 1 and the frequency 65 of the phrase 2 and excludes the frequencies of the phrases 3 to 5 from the sum. As a result, the sum of the frequencies calculated with respect to text 2 amounts to 850 including frequencies for phrases not shown.

Then, the priority setting unit 610 sets a higher priority for an input text 22 that has a larger one of the sums of the frequencies calculated in this manner. For example, the sums for text 2 and text 1 are 850 and 650, respectively, so the priority setting unit 610 sets a higher priority for the text 2 than that for the text 1. The priority setting unit 610 also sets priorities for other input texts 22 in this way. As a result, the descending priorities are the text 2, the text 1, the text 4, the text 3, and the text 5. The input texts 22 are displayed in rows of FIG. 8 according to these priorities.

Figure 9:
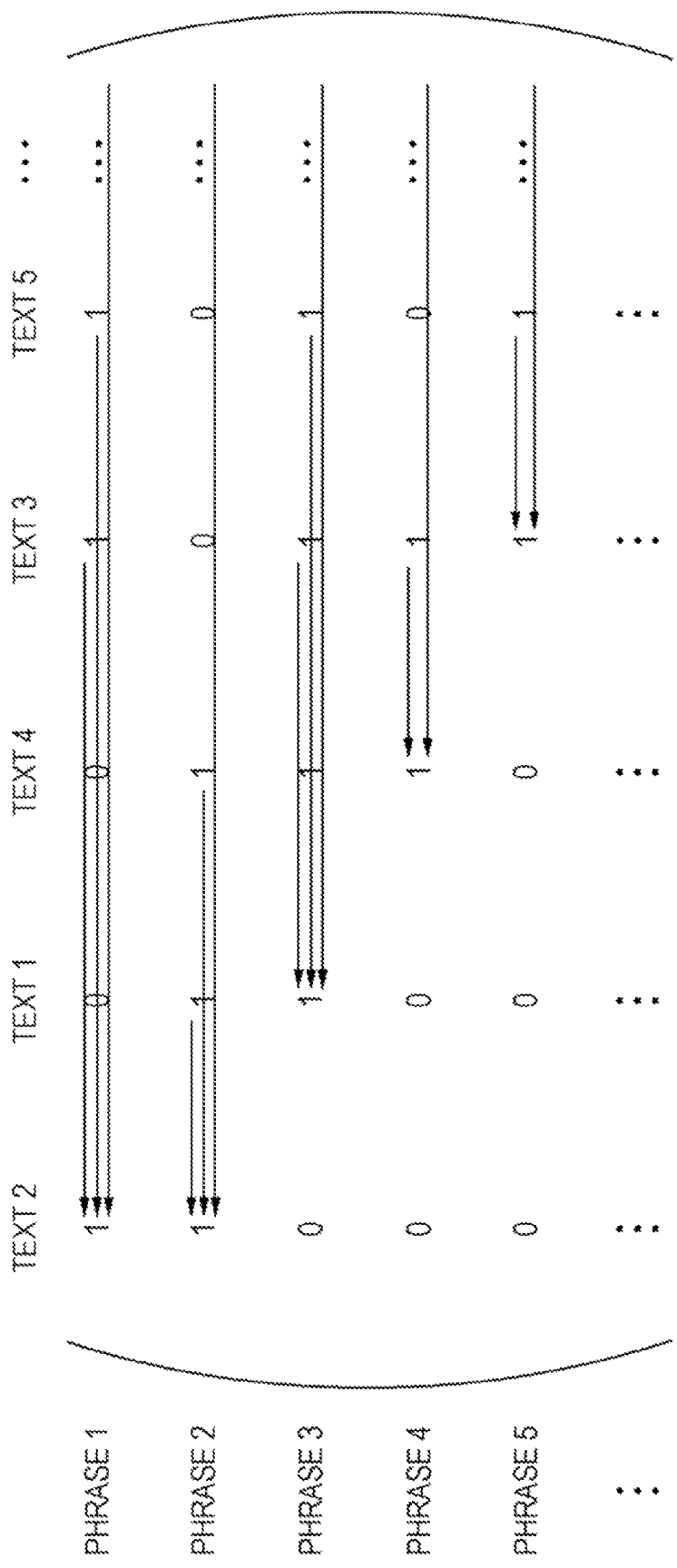
FIG. 9 depicts an example of index calculation.

FIG. 9 depicts an example of index calculation. First, with respect to each of the phrases 300, the index calculation unit 620 assigns input texts 22 including the phrase 300 with numerical values. These numerical values may be determined according to a predetermined rule, such as, if an input text 22 includes the phrase 300, the input text 22 is associated with an integer 1; if not, the input text is associated with an integer 0. For example, as is the case with the priority setting unit 610, such numerical values may be the number of each phrase 300 included in each input text 22. The numerical values with which the input texts 22 are associated in this way are shown as elements of a matrix in which the phrases 300 are displayed in the column direction and the input texts 22 are displayed in the row direction, as shown in FIG. 9.

Then the index calculation unit 620 calculates indexes on the basis of these numerical values. Specifically, with respect to each of the phrases 300, the index calculation unit 620 calculates the index for an input text 22 having the highest priority among input texts 22 including the phrase 300, on the basis of a numerical value with which an input text 22 not having the highest priority among the input texts 22 including the phrase 300 is associated. For example, with respect to each of the phrases 300, the index calculation unit 620 may calculate the index for the input text 22 having the highest priority among the input texts 22 including the phrase 300 by adding the numerical value with which the input text 22 not having the highest priority among the input texts 22 including the phrase 300 is associated, to the numerical value with which the input text 22 having the highest priority is associated.

On the other hand, with respect to each phrase 300, numerical values with which input texts 22 not having the highest priority among input texts 22 including the phrase 300 are associated are not used in calculating the indexes of these input texts 22. For example, the indexes of these input texts 22 may be 0 regardless of what numerical values these input texts 22 are associated with. In other words, the numerical values with which these input texts 22 are associated may be used to calculate the index for the input text 22 having the highest priority rather than to calculate the indexes of these input texts 22.

The above-mentioned calculation process is indicated by the arrows in FIG. 9. Specifically, with respect to each row of a matrix in which the input texts 22 are displayed in the row direction according to the priorities, the index calculation unit 620 sequentially adds, to an element in the most left column among non-zero elements, non-zero elements in columns on the right of the element.

As a result, with respect to each phrase 300, the index calculation unit 620 is able to calculate the frequency at which the phrase 300 appears across the multiple input texts to calculate the index representing the calculated appearance frequency for an input text 22 having the highest priority among input texts 22 including the phrase 300.

FIG. 10 displays the sums of the indexes calculated by the index calculation unit 620. The indexes calculated by the index calculation unit 620 are underlined in FIG. 10. For example, with respect to the phrase 1, the index calculation unit 620 calculates an index 135 for the text 2. Also, the index calculation unit 620 calculates an index smaller than the index 135, for example, zero, for other input texts 22 including the phrase 1. Then the index calculation unit 620 calculates the sums of these indexes for each input text 22. For example, with respect to text 2, the index calculation unit 620 sums up index 135 corresponding to the phrase 1, index 65 corresponding to phrase 2, and indexes corresponding to other phrases not shown. Thus, the sum is 850. By referring to the sums calculated in this way, the output unit 630 is able to properly select the selected texts 20 that should be used to verify the translation.

Figure 11:
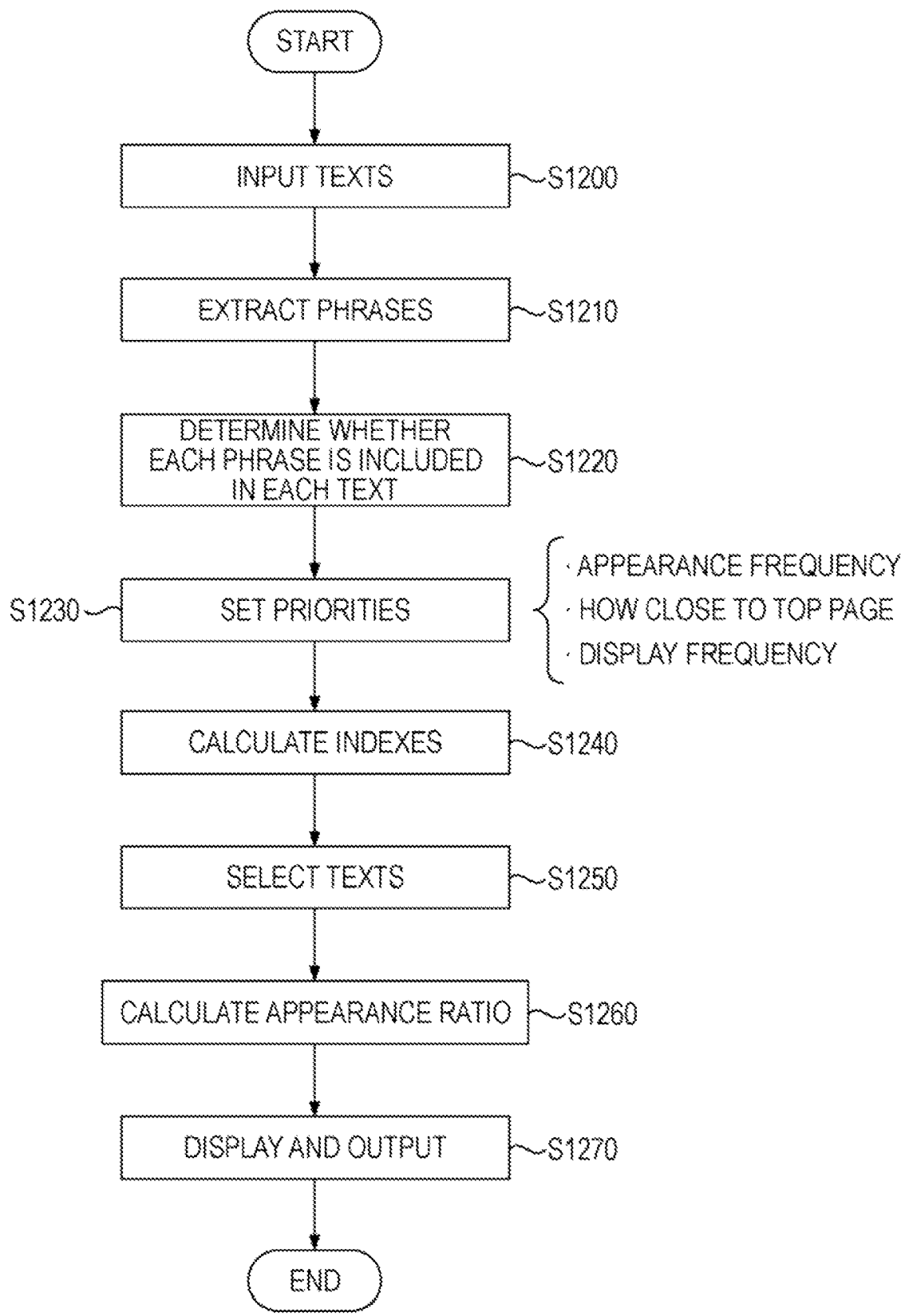
FIG. 11 depicts a flowchart of example operations to selects texts that should be output.

FIG. 11 depicts a flowchart of example operations to selects texts that should be output. First, the selection system 200 receives multiple input texts 22 (S1200). For example, if the translation system 20 aims to assist in verifying the quality of the translations of web sites, the selection system 200 may receive an input of the address (for example, a uniform resource locator (URL), an IP address, etc.) of a web site. In this case, in response to the input of the address, the selection system 200 accesses the web site having the address to obtain multiple input texts 22. Also, the selection system 200 may select only input texts 22 in a particular category from among the obtained input texts 22 so that these input texts 22 are processed by the determination unit 600. For example, the selection system 200 may select only web pages reachable from a web page having an index of information on a certain product so that only the web pages related to the product are processed.

Next, the determination unit 600 extracts the phrases 300 from the input texts 22 (S1210). For example, as described above, the determination unit 600 may extract character strings between start tags and end tags in the input texts 22 that are HTML documents, as the phrases 300. Further, the determination unit 600 may divide such character strings into sentences and extract such sentences as the phrases 300. Furthermore, if different multiple character strings have a predetermined relationship with one another, such as one in which these multiple character strings are slightly different from one another, the determination unit 600 may extract these character strings as identical phrases 300.

Specific examples in which multiple character strings are extracted as identical phrases 300 will now be described. A first example relates to character strings each including a proper noun. The determination unit 600 converts proper nouns in the input texts 22 into general nouns collectively representing these proper nouns, symbols representing such general nouns, or the like. For example, a proper noun, such as "www.Δυx.com," is converted into a general noun, such as "Web Address." Then the determination unit 600 extracts the multiple character strings that have been converted into identical character strings, as identical phrases 300. As a result, the multiple character strings that have become identical ones, for example, except for web site names, are handled as identical phrases 300 in calculating the frequencies and indexes.

A second example relates to multiple character strings that only partially differ from one another. With respect to each of sets each made up of two character strings included in the input texts 22, the determination unit 600 determines whether or not the ratio of matched words to all words included in the two character strings is equal to or greater than a reference value and if the difference between the frequencies at which the two character strings each appear across the multiple input texts 22 is equal to or greater than another reference value. If these conditions are met, the determination unit 600 extracts these two character strings as identical phrases 300. If a character string including 20 words appears 144 times across the multiple input texts 22 and if another character string that differs from the character string by one word appears only once across the multiple input texts 22, the determination unit 600 extracts these character strings as identical phrases 300. Thus, multiple character strings that have less necessity to be distinguished in terms of verification of the translation are handled as identical phases 300. This makes the subsequent processes more efficient.

Next, the determination unit 600 determines if each of the multiple phrases 300 is included in each of the multiple input texts 22 (S1220). Then the priority setting unit 610 sets priorities between the multiple input texts 22 on the basis of these determinations (S1230). As described above, these priorities may be determined on the basis of the frequencies of the phrases 300 or on the basis of the number of requests received to display the input texts 22 that are web pages. In addition, the priorities may be determined based on the distance the web page containing the input texts 22 is from a parent web page.

For example, the priority setting unit 610 determines to what extent each of the input texts 22 is close to the top page (for example, a page that is accessed using only a domain name without adding another file name or path) of the web site in the hierarchy between web pages in the web site. Specifically, with respect to each of the input texts 22, the priority setting unit 610 may calculate the minimum frequency of clicking of hyperlinks necessary to go from the top page to the input text 22. Then, for example, the priority setting unit 610 sets a higher priority for an input text 22 whose clicking frequency is lower than those of other input texts 22, than those for such other input texts 22.

Then, with respect to each of the multiple phrases, the index calculation unit 620 calculates a larger index for an input text 22 having the highest priority set by the determination unit 600 among input texts 22 including the phrase, than those for other input texts 22 (S1240). Specific index calculation methods are similar to what have been described with reference to FIGS. 9 and 10. Then, the output unit 630 selects input texts 22 having larger calculated indexes (S1250). For example, the output unit 630 may select a predetermined number (N number) of input texts 22 that have the largest calculated indexes.

Then, the output unit 630 calculates the appearance ratio that is the ratio of the sum of the indexes with respect to these selected input texts 22 to the sum of the calculated indexes with respect to all the multiple input texts 22 (S1260). The appearance ratio represents the proportion that the phrases 300 included in the selected input texts 22 make up the phrases 300 included in all the input texts 22. Further, the output unit 630 may generate a graph indicating changes in appearance ratio made when additional input texts 22 have been selected in stages.

Then, the output unit 630 outputs the group of the selected input texts 22 as a group of texts suitable for verifying the quality of translation of the web site (S1270). Also, the output unit 630 outputs each of the selected input texts 22 in such a manner that the selected input text 22 is associated with an phrase 300 with respect to which the index calculation unit 620 has calculated a larger index for the selected input text 22 than those for other input texts 22 (S1270). As described with reference to FIG. 4, an URL for identifying an input text 22 is outputted in such a manner that the URL is associated with an English phrase with respect to which a larger index has been calculated for the input index 22 than those for other input texts 22. This allows the user to recognize which phrase's mistranslation should be verified in which input text 22.

Figure 12:
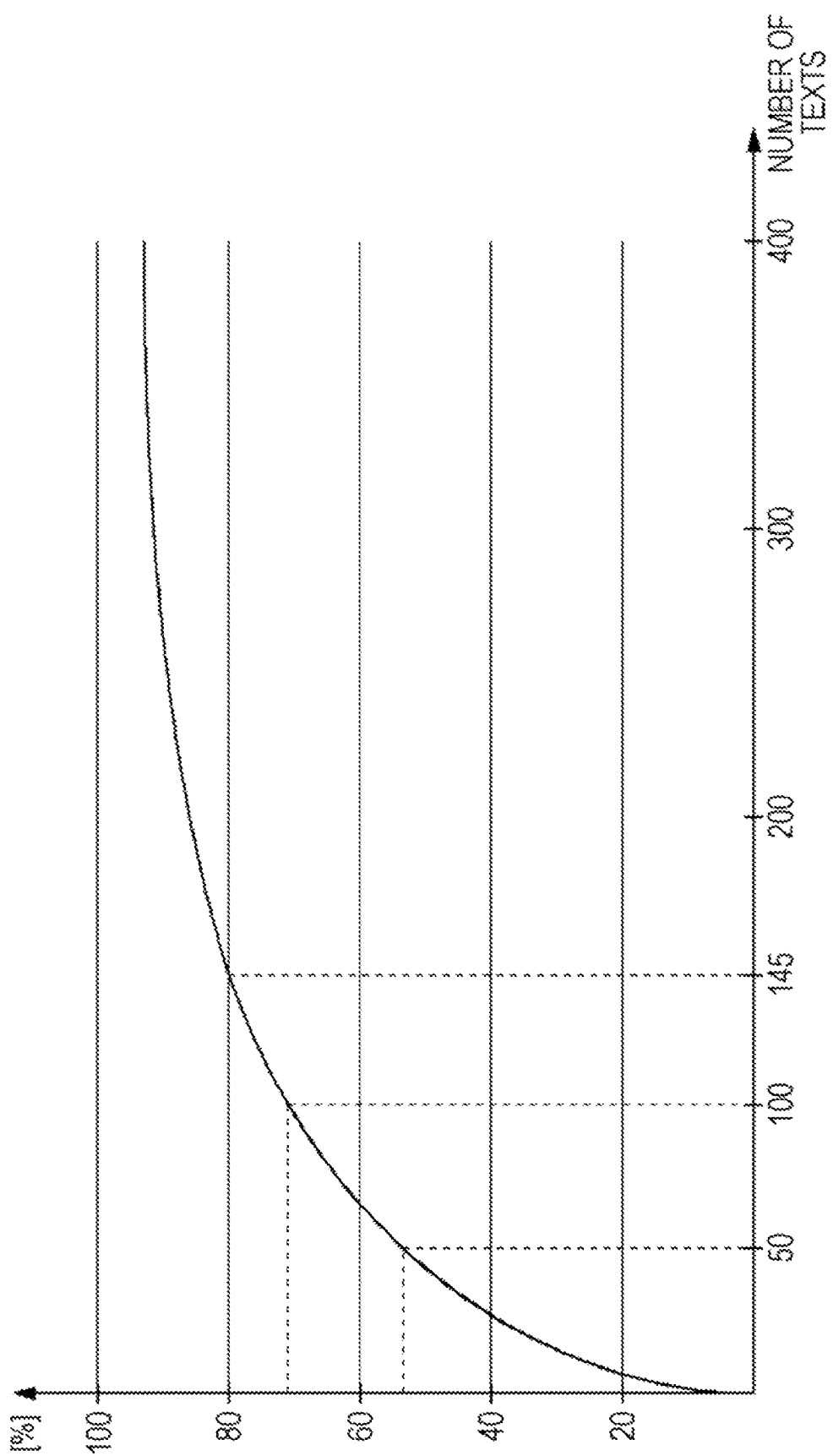
FIG. 12 depicts an example graph of appearance ratios.

Further, the output unit 630 may output an appearance ratio or a graph thereof. FIG. 12 shows an example of such a graph.

FIG. 12 depicts an example graph of appearance ratios. The transverse axis represents the number of the texts selected as the selected texts 205. The longitudinal axis represents the appearance ratio. By referring to this graph outputted by the output unit 630, the following knowledge is obtained. First, the appearance ratio assumed by the current selected texts is understood. For example, if the number of the selected texts is set to 100, it is understood, by referring to this graph, that the appearance ratio assumed by these selected texts is approximately 70%. Thus, before conducting an update of the dictionary for translation, it can be expected to what extent the update will improve the quality.

Second, it is understood what amount of texts should be used for verifying the translation in order to achieve the quality goal. For example, it is understood that if the quality goal is that mistranslations are eliminated from 80% of the phrases 300, it is sufficient to use 145 input texts 22 for verification of the translation in order to achieve the quality goal. Third, the progress is correctly understood. For example, assume that while the goal is set to 80%, the number of input texts 22 that have been verified is 50. In this case, it is correctly understood what level the quality has reached relative to the goal (in this example, approximately 55% relative to 80%).

Another index calculation method will now be described with reference to FIG. 13.

Figure 13:
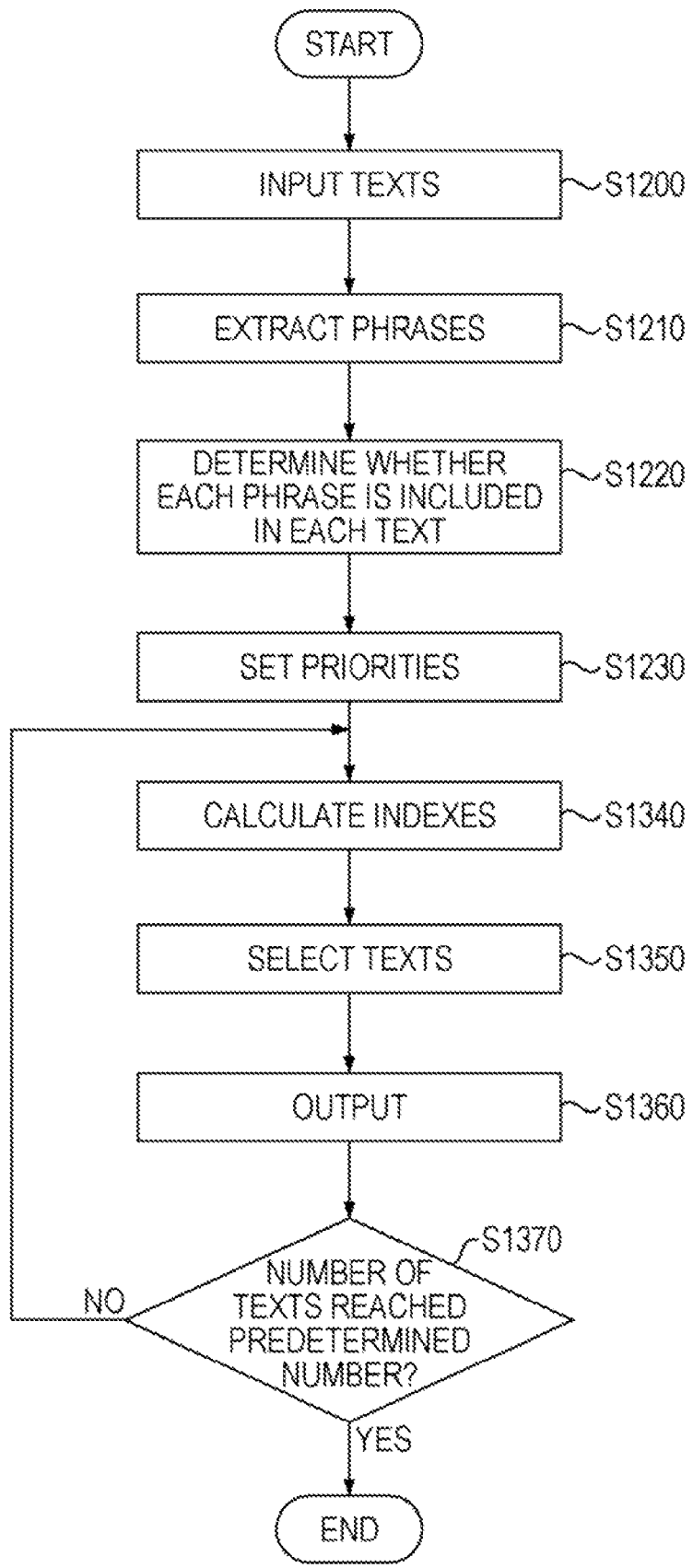
FIG. 13 depicts a flowchart of example operations to be performed by the selection system 200 according to a modification of this embodiment.

FIG. 13 depicts a flowchart of example operations to be performed by the selection system 200 according to a modification of this embodiment. S1200 to S1230 are the same as the processes described with reference to FIG. 11. Subsequent processes will be described.

First, with respect to each of the multiple phrases, the index calculation unit 620 calculates a larger index for an input text 22 having the highest priority set by the determination unit 600 among input texts including the phrase, than those for other input texts 22 (S1340). Next, the output unit 630 outputs input texts 22 that have the largest ones among the sums of the calculated indexes for each input text 22 (S1350). Then, the output unit 630 determines whether or not the number of the outputted texts 22 has reached a predetermined number (S1370).

If the number of the outputted texts 22 has not reached the predetermined number (S1370: NO), the index calculation unit 620 returns the processing to S1340 and further calculates indexes for multiple input texts 22 excluding the outputted texts and with respect to multiple phrases 300 excluding the phrases included in the outputted texts. These calculations will be described with reference to FIGS. 9 and 10. If, in FIG. 10, the texts are disposed in order of decreasing the sum of the indexes at a time when no text has been outputted, the texts are disposed in the order of the text 2, the text 4, the text 1, the text 3, and the text 5.

Here, if two texts are outputted and the remaining texts are disposed in order of decreasing the sum of the calculated indexes, the remaining texts are disposed in the order of the text 1, the text 3, and the text 5. However, the phrase 3 included in the text 1 is also included in the text 4 that has been outputted. Therefore, the sum of the indexes for the text 1 is calculated excluding the phrase 3, that is, the sum is reduced by 20. As a result, the sums for these remaining texts are different from the originally calculated sums, so the disposition order of these remaining texts may change. Thus, the index calculation unit 620 may recalculate the indexes each time input texts 22 are outputted and select input texts 22 that should be selected with the highest priorities, from among the remaining input texts 22. As described above, various modifications of the index calculation method are conceivable. Also according to this modification, a group of selected texts 205 comprehensively including the phrases 300 included in the multiple input texts 22 is selected.

Figure 14:
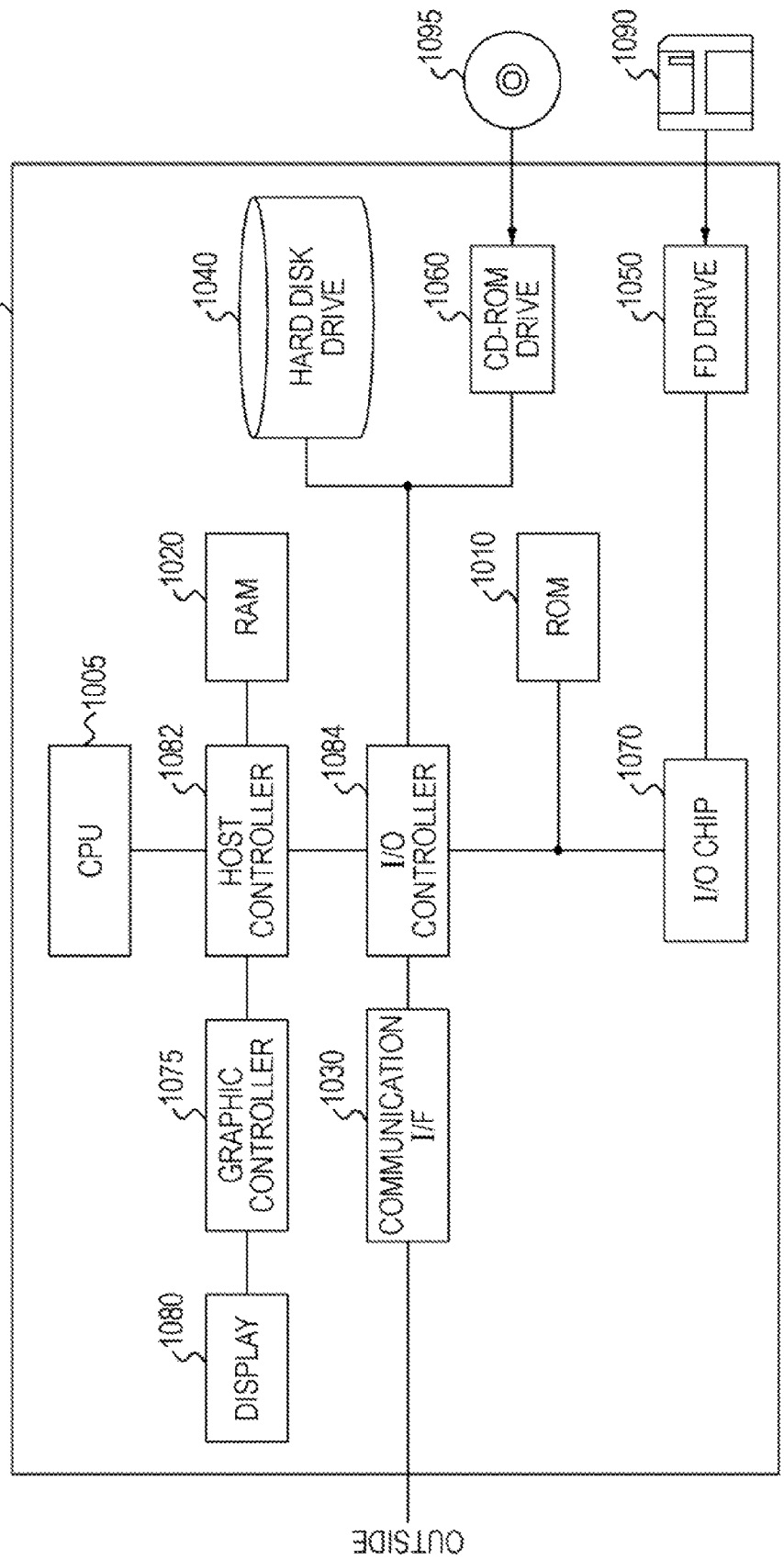
FIG. 14 depicts an example of the hardware configuration of a computer 500 serving as the translation system 20 according to this embodiment.

FIG. 14 depicts an example of the hardware configuration of a computer 500 serving as the translation system 20 according to this embodiment. The computer 500 includes a CPU peripheral unit, an input/output unit, and a legacy input/output unit. The CPU peripheral unit includes a CPU 1005, a RAM 1020, and a graphic controller 1075, which are mutually connected via a host controller 1082. The input/output unit includes a communication interface 1030, a hard disk drive 1040, and a compact disc-read-only memory (CD-ROM) drive 1060, which are connected to the host controller 1082 via an input/output controller 1084. The legacy input/ output unit includes a ROM 1010, a flexible disk drive 1050, and an input/output chip 1070, which are connected to the input/output controller 1084.

The host controller 1082 connects the RAM 1020 with the CPU 1005 that accesses the RAM 1020 at a high transfer rate, and the graphic controller 1075. The CPU 1005 operates according to programs stored in the ROM 1010 and RAM 1020 and controls each component. The graphic controller 1075 acquires image data generated by the CPU 1005 or the like on a frame buffer provided in the RAM 1020 to display the image data on a display 1080. Alternatively, the graphic controller 1075 may include a frame buffer for storing image data generated by the CPU 1005 or the like.

The input/output controller 1084 connects the host controller 1082 with the communication interface 1030 that is a relatively high-speed input/output device, the hard disk drive 1040, and the CD-ROM drive 1060. The communication interface 1030 communicates with external devices via a network. The hard disk drive 1040 stores a program and data to be used by the computer 500. The CD-ROM drive 1060 reads a program or data from the CD-ROM 1095 and provides the read program or data to the RAM 1020 or hard disk drive 1040.

Also connected to the input/output controller 1084 are the ROM 1010 and relatively low-speed input/output devices, such as the flexible disk drive 1050 and the input/output chip 1070. The ROM 1010 stores a boot program to be executed by the CPU 1005 at a boot of the computer 500 or a program or the like dependent on the hardware of the computer 500. The flexible disk drive 1050 reads a program or data from the flexible disk 1090 and provides the read program or data to the RAM 1020 or hard disk drive 1040 via the input/output chip 1070. Connected to the input/output chip 1070 is a flexible drive 1050, and various types of input/output devices, for example, via a parallel port, a serial port, a keyboard port, a mouse port, or the like.

A program to be provided to the computer 500 by the user is stored in a recording medium, such as the flexible disk 1090, the CD-ROM 1095, or an integrated circuit (IC) card. The program is read from such a recording medium via the input/output chip 1070 and/or input/output controller 1084 and installed to the computer 500 so as to be executed. Operations that the program causes the computer 500 or the like to execute are the same as those in the translation system 20 described with reference to FIGS. 1 to 13 and will not be described.

The above-mentioned program may be stored in an external storage medium. Besides the flexible disk 1090 and CD-ROM 1095, such recording media include optical recording media such as a digital versatile disc (DVD) and a phase change rewritable disk (PD), magneto-optical recording media such as a MiniDisc (MD) (trademark), tape media, and semiconductor memories such as an IC card. Further, a storage device, such as a hard disk or a RAM, provided in a server system connected to a dedicated communication network or the Internet may be used as a recording medium so that the storage device provides a program to the computer 500 via such a network.

While the present inventive subject matter has been described using the embodiment, the technical scope of the inventive subject matter is not limited to the scope described in the above-mentioned embodiment. It is apparent for those skilled in the art that various changes and modifications can be made to the embodiment. It is apparent from the description of the appended claims that embodiments including such changes or modifications can also fall within the technical scope of the inventive subject matter.

What is claimed is:

1. A computer-implemented method comprising:
   determining if one or more phrases are in a plurality of texts submitted for a translation;
   setting priorities for the plurality of texts utilizing a processor and based, at least in part, on a frequency of occurrence of the one or more phrases within the texts;
   calculating an index for each of the plurality of texts based at least in part on the respective priorities of the one or more texts; and
   indicating a subset of the plurality of texts for verifying the translation, wherein the subset of texts comprises those of the plurality of texts with the highest indexes.

2. The computer-implemented method of claim 1, wherein said setting further comprises determining priority preferences defined by a user.

3. The computer-implemented method of claim 1 further comprising assigning a higher numerical value for the index of an input text that has a higher priority.

4. The computer-implemented method of claim 1, further comprising calculating an appearance ratio that is a ratio of a sum of the indexes of the subset of texts to a sum of the indexes of the plurality of texts.

5. The computer-implemented method of claim 4 further comprising generating a graph depicting the appearance ratio for at least one of the subset of texts.

6. The computer-implemented method of claim 1 further comprising determining if similar phrases are considered to be identical phrases.

7. The computer-implemented method of claim 6 further comprising converting proper nouns into general nouns collectively representing proper nouns.

8. The computer-implemented method of claim 6 further comprising determining if a ratio of matched words in two phrases is greater than or equal to a first reference value and if the respective phrases appear in numbers greater than or equal to a second reference value.

9. One or more tangible, machine-readable storage media having stored therein a program product, which when executed a set of one or more processor units causes the set of one or more processor units to perform operations that comprise:
   determining if one or more phrases are in a plurality of texts submitted for a translation;
   setting priorities for the plurality of texts based, at least in part, on a frequency of occurrence of the one or more phrases within the texts;
   calculating an index for each of the plurality of texts based at least in part on the respective priorities of the one or more texts; and
   indicating a subset of the plurality of texts for verifying the translation, wherein the subset of texts comprises those of the plurality of texts with the highest indexes.

10. The machine-readable storage media of claim 9, wherein said operations further comprise determining priority preferences defined by a user.

11. The machine-readable storage media of claim 9, wherein the operations further comprise assigning a higher numerical value for the index of an input text that has a higher priority.

12. The machine-readable storage media of claim 9, wherein the operations further comprise calculating an appearance ratio that is a ratio of a sum of the indexes of the subset of texts to a sum of the indexes of the plurality of texts.

13. The machine-readable storage media of claim 9, wherein the operations further comprise determining if similar phrases are considered to be identical phrases.

14. An apparatus comprising:
a set of one or more processing units;
a network interface; and
a selection unit operable to,
determine if one or more phrases are in a plurality of texts submitted for a translation;
set priorities for the plurality of texts based, at least in part, on a frequency of occurrence of the one or more phrases within the texts;
calculate an index for each of the plurality of texts based at least in part on the respective priorities of the one or more texts; and
indicate a subset of the plurality of texts for verifying the translation, wherein the subset of texts comprises those of the plurality of texts with the highest indexes.

15. The apparatus of claim 14 wherein the selection unit is further operable to calculate an appearance ratio that is a ratio of a sum of the indexes of the subset of texts to a sum of the indexes of the plurality of texts.

16. The apparatus of claim 14 further comprising a translation unit for verification operable to translate the subset of texts from a first language to a second language.

17. The apparatus of claim 14 further comprising a template generation unit operable to generate a template that associates the one or more phrases with translations of the one or more phrases.

18. The apparatus of claim 14 further comprising a verification unit operable to automatically compare translations against translations in a verified template that is based on the subset of texts.

19. The apparatus of claim 18 further comprising a translation unit operable to translate the plurality of texts using the verified template.

* * * * *